Aug. 9, 1927.
T. E. MURRAY
1,638,546
VALVE AND THE LIKE AND METHOD OF MANUFACTURE
Filed Feb. 28, 1923     4 Sheets-Sheet 1
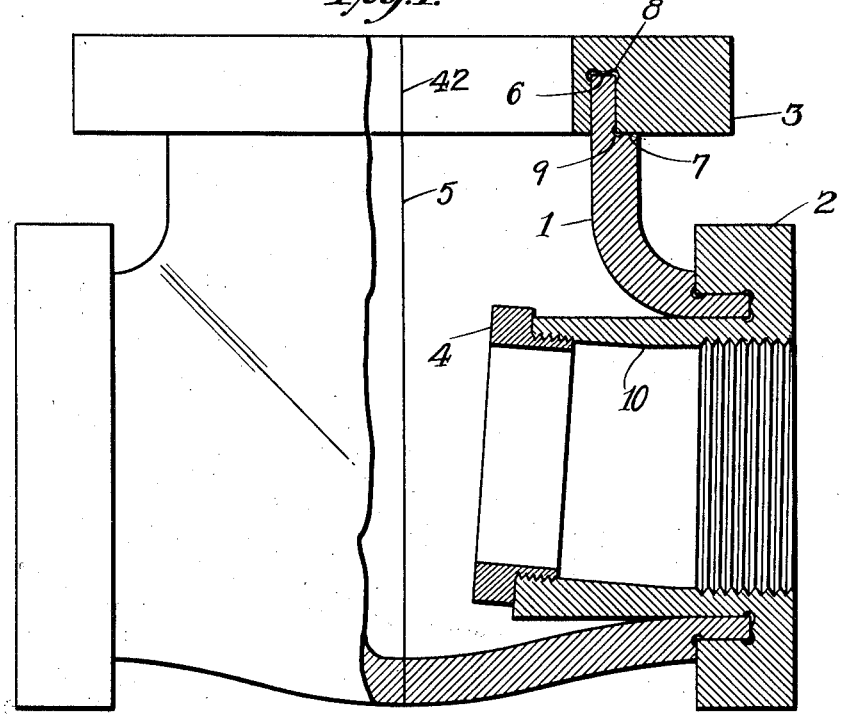
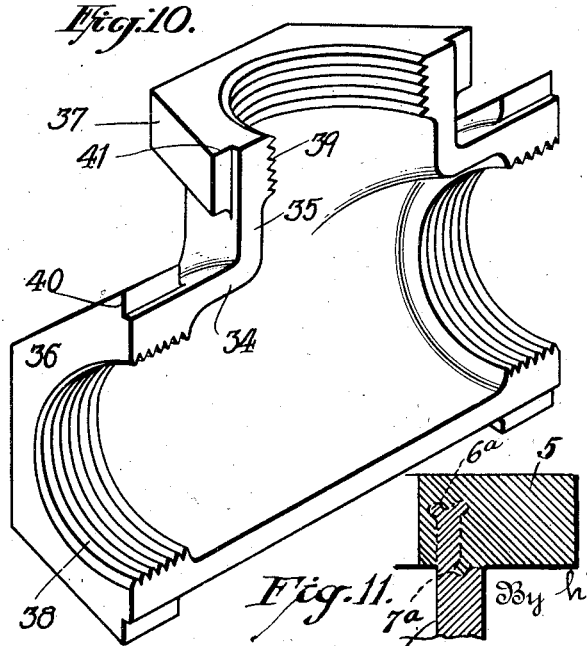
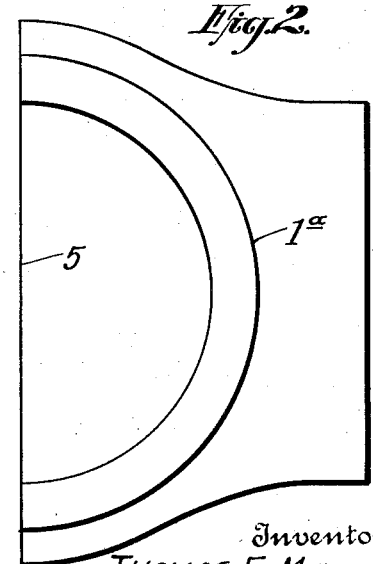
Inventor
THOMAS E. MURRAY
By his Attorney Aug. 9, 1927.
T. E. MURRAY
1,638,546
VALVE AND THE LIKE AND METHOD OF MANUFACTURE
Filed Feb. 28, 1923      4 Sheets-Sheet 2
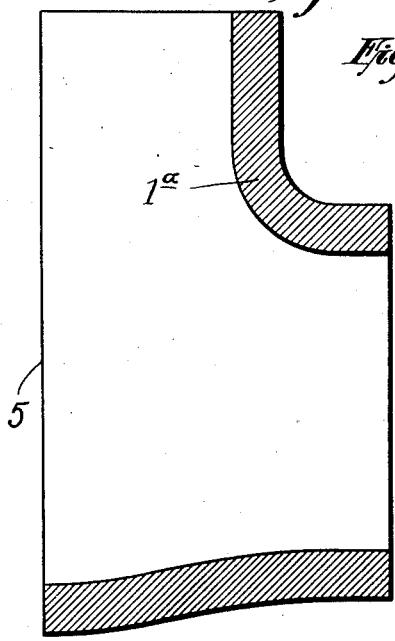
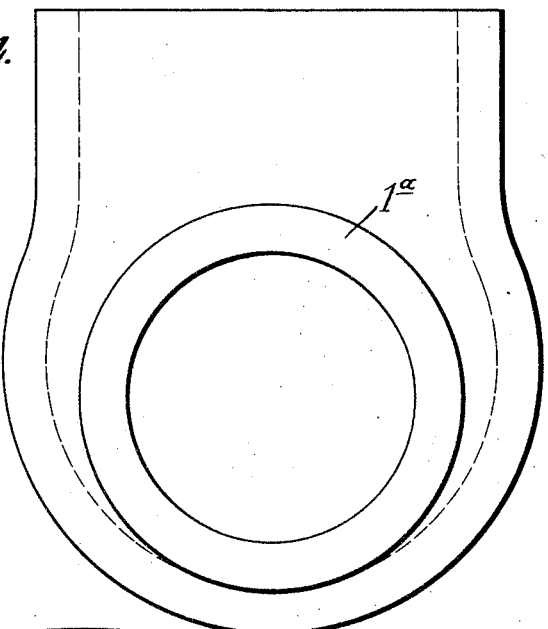
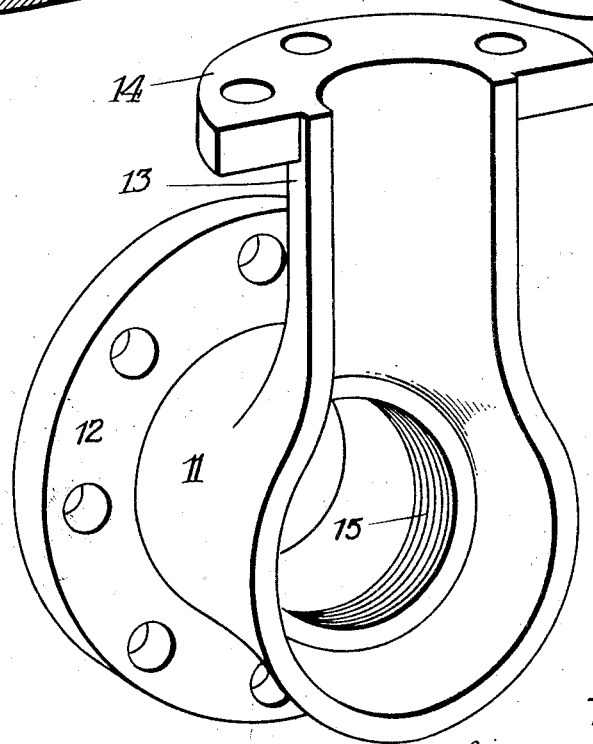
Inventor
THOMAS E. MURRAY
By his Attorney Aug. 9, 1927.

T. E. MURRAY 1,638,546

VALVE AND THE LIKE AND METHOD OF MANUFACTURE

Filed Feb. 28, 1923     4 Sheets-Sheet 3

Inventor
THOMAS E. MURRAY
By his Attorney
D. Anthony Usina

Aug. 9, 1927.
T. E. MURRAY
1,638,546
VALVE AND THE LIKE AND METHOD OF MANUFACTURE
Filed Feb. 28, 1923 4 Sheets-Sheet 4
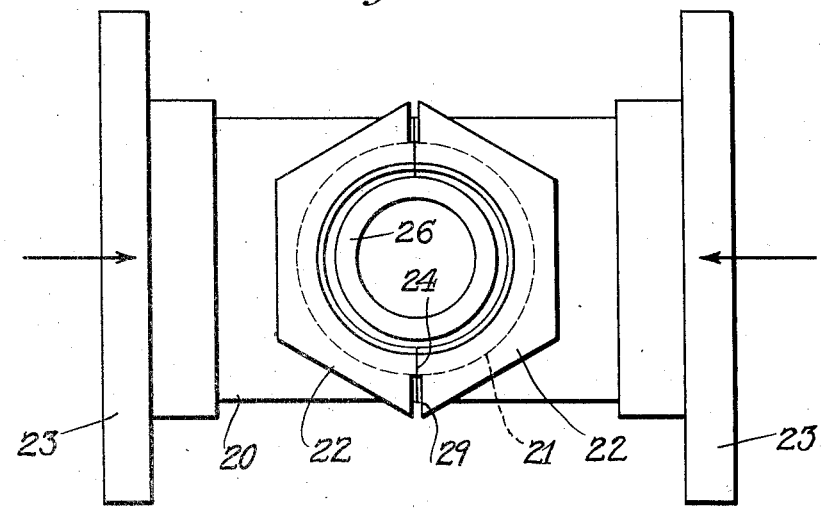
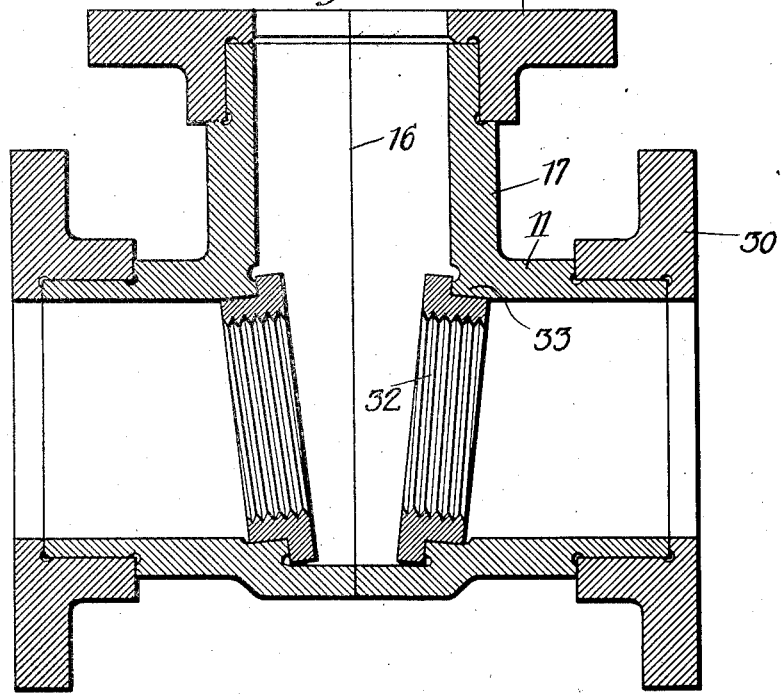
Inventor
THOMAS E. MURRAY
By his Attorney Patented Aug. 9, 1927.

1,638,546

UNITED STATES PATENT OFFICE.

THOMAS E. MURRAY, OF BROOKLYN, NEW YORK.

VALVE AND THE LIKE AND METHOD OF MANUFACTURE.

Application filed February 28, 1923. Serial No. 621,730.

My invention aims to provide certain improvements in the production of valves from separate parts forged or drawn up from sheet metal or produced in various other ways and welded together. The invention is applicable to pipe fittings generally, including valves and similar articles; and certain features of invention are applicable to rods or the like as well as to tubular articles.

The accompanying drawings illustrate embodiments of my invention.

Fig. 1 is in part a side elevation and in part a longitudinal section of the body of a gate valve;

Figs. 2, 3 and 4 illustrate one of the segments used in the making of the same; Fig. 2 being a plan; Fig. 3 a longitudinal section and Fig. 4 a side elevation;

Fig. 5 is a perspective view of a part similar to that shown in Figs. 2, 3 and 4 with certain flanges added;

Fig. 8 is a plan of the parts of Fig. 7 before the welding of them together;

Fig. 9 is a section of the third design of gate valve;

Fig. 10 is a perspective view of a segment of a T, analogous to the valve casings shown in the previous figures.

Fig. 11 is a detail of a completed joint.

Figure 6:
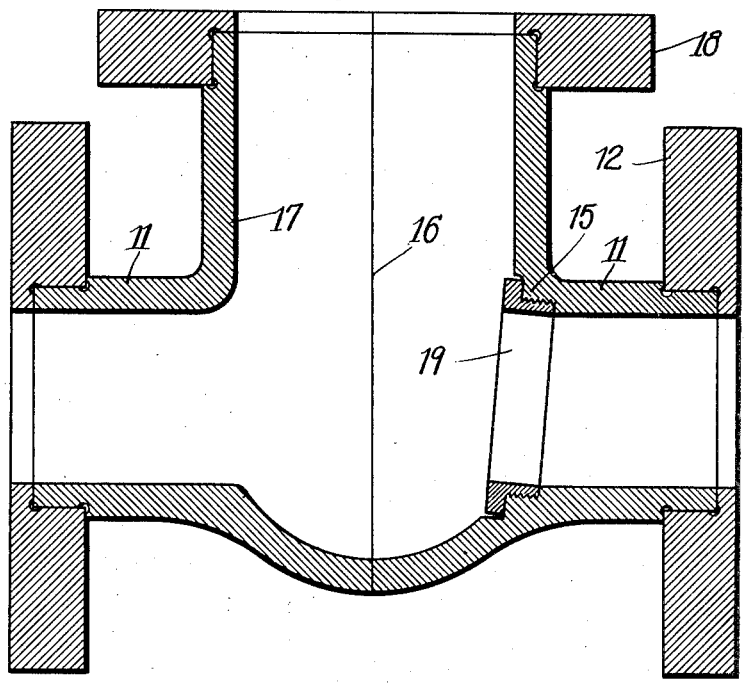
Fig. 6 is a longitudinal section of a valve of ordinary gate type.

Referring first to Figs. 1 to 4, the valve body consists of a casing or shell 1 with the usual two longitudinal branches and one transverse branch, flanges 2 and 3 on the ends of said branches and valve seats 4 within the casing. The valve shell 1 is made in two halves 1ª, Figs. 2, 3 and 4 which may be drawn up from sheet metal if it is to be of light weight or may be forged or otherwise produced. That is to say the shell is made in two halves divided along a transverse plane through the lateral branch or head of the shell. By splitting the casing of valves of this general class, such as gate valves and globe valves in this way, it can be produced with dies of comparatively simple shape. The two halves of the shell are to be welded along the line 5 to produce the complete shell of Fig. 1.

In applying the flanges my present invention introduces an improvement which is applicable not only to the particular case illustrated but generally to the application of flanges to tubular products or rods or the like. Two welded joints are made in different planes. For example, the flange 3 and the corresponding part of the shell 1 are shaped to provide two joints 6 and 7 in different planes transverse to the axis of this part of the shell and transverse to the direction of the pressure under which the parts are welded. Preferably the parts are butt welded together, being held between electrodes and pressed toward each other in a direction normal to the joint surfaces at 6 and 7, so that when the current is passed there will be a welding at these points, with a take-up or extrusion of metal. The parts are provided also with undercut grooves 8 and 9 to receive the metal extruded and thereby to form a good mechanical lock in addition to the welded joint, this method being described more fully and claimed in my application No. 616,032 filed January 31, 1923. The parts may be proportioned so as to effect the weld at the two joints 6 and 7 simultaneously or one after the other in the manner described in the application of Thomas E. Murray, Jr., Serial Number 617,410, filed February 6th, 1923.

Fig. 11 shows the parts after the welding operation has been performed. The metal of the shell 1 is mushroomed into the flange 3 as indicated by the completed joint 6ª; and the metal of the part 3 is locked into the groove in the part 1 at the completed joint 7ª.

In connection with the flanges 2, the present invention introduces a new feature in the combining of these flanges with tubular portions 10 which extend into the casing of the valve and form parts for the seats 4. These parts may be threaded on their inner ends as shown for the reception of threaded valve seats, or may be otherwise formed for attachment to such seats, (as for example by welding, Fig. 9). In addition the part 10 may be threaded at its outer end for connection with an adjacent length of pipe.

The parts may be assembled in different orders. For example the shell 1 may be completed before the flanges and the valve seats and supports are applied thereto.

Fig. 5 illustrates a similar method, with some differences in the casing in detail. The longitudinal branch 11 of the casing carries welded on its end a completely circular flange 12 with bolt holes therethrough. The half 13 of the lateral branch carries welded on its end a segment 14 of a similar flange with bolt holes. The casing shown in this figure has a thread 15 formed directly therein for receiving the valve seat. It is to be observed that the flanges in this case as well as the proportions and details of the casing are different from those in the previous figures, and it will be understood that the details in the two cases are interchangeable. Fig. 6 is a longitudinal section of a gate valve made with the use of two segments like Fig. 5. The segments are welded together along the line 16 forming the shell with the longitudinal branches 11 and with a lateral branch 17 which is formed of the two parts 13 of Fig. 5; and with end flanges 12 and a lateral flange 18 formed of the two segments 14 of Fig. 5. The valve is completed by the introduction of seat 19. In some types of valve a single seat 19 is sufficient. For other types a second seat will be identically placed at the opposite side of the valve chamber.

Figure 7:
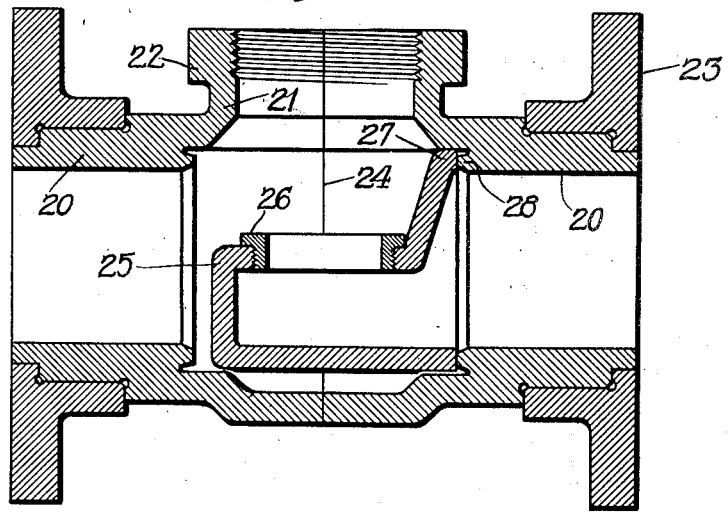
Fig. 7 is a similar section of a valve of globe type.

According to Fig. 7 the valve casing is formed with longitudinal branches 20 and a lateral branch 21; the latter being threaded and provided with an integral flange 22, while the longitudinal ends are provided with extra large flanges 23 welded on the casing and designed for bolting to adjacent parts. The casing is first formed in segments similar to those of Figs. 2, 3 and 4, divided from each other along a transverse plane 24 through the lateral flange 21 of the casing, the segments being joined by welding along this line. A supporting member 25 for the valve seat 26 is formed with a circular edge 27 fitting on edge 28 formed at one end of the valve chamber so as to facilitate the joining of the support to the casing by welding said edges together. The valve support 25, and the same is true of the valve support 10 of Fig. 1, may be sufficiently accurately shaped to form directly a seat for the valve. But generally the valve will be supported through an intermediate finished seat screwed or otherwise fastened to the support. The support 25 of Fig. 7 will be welded to one of the segments of the valve casing preferably before the two segments are welded together. The casing segments can be drawn up from sheet metal or forged. Likewise the valve support can be stamped and drawn up from sheet metal either in one piece or in two halves divided along a vertical longitudinal plane and welded together, or may be made in various other ways.

The plan, Fig. 8, illustrates particularly a feature of advantage which can be utilized in making valve casings and generally in making tubular articles with flanges or other parts of extra thickness. The increased thickness of the wall at the flange (or width of the flange, like the flange 14 in Fig. 5 and the flange 22 in Figs. 7 and 8) is for convenience in use as in the application of a wrench, and adds no strength against the actual strains of use, since the casing is generally only as strong as its lightest section. The same considerations apply to various other articles with parts of extra thickness. A better weld generally can be made if we have uniform or approximately uniform thickness over the entire length of the joint. We prefer, therefore, to weld the segments together without welding the full thickness of the flange or other extra-thick part. Thus, in Fig. 8 the extra thickness of the face of the flange 22 is cut back from the plane of the joint 24, as indicated at 29. The joint 24, therefore is of the same thickness at the flange as it is elsewhere. The dimensions are such that when the segments are pressed together in the direction of the arrows the take-up of metal at the joint will be substantially such as to bring the extra thickness 29 thereof into bearing contact without any weld, or at least no substantial weld such as involves a take-up of metal and a dissipation of electric current through these parts.

The gate valve of Fig. 9 is substantially like that of Fig. 6, but illustrates certain differences in detail in the application of the invention. The casing has similar longitudinal branches 11 and a lateral branch 17 with flanges 30 and 31 welded on their ends; the casing being made of segments welded together along the central line 16. Valve supports 32 are welded directly to edges 33 of the casing at the sides of the valve chamber by a joint in two planes as indicated most clearly at the bottom of the figure; these valve supports being threaded for application of finished valve seats. Or the finished seats themselves may be applied in the manner of the parts 32.

Fig. 10 shows the application to a T of the feature described in connection with a gate valve where the extra thickness of the flanges is not welded. The figure illustrates a longitudinal segment with end portions 34 and a lateral branch 35 and flanges 36 and 37 formed integral on the ends, with internal threads 38 and 39. When two such segments are welded together the welded joint will have throughout its length the thickness of the parts 34 and 35, with maybe a slight extra allowance for the threads. The extra thickness of the flanges at the welded joint, as indicated at 40 and 41, is set back so that there will be no substantial welding thereof. Segments such as are shown in Fig. 10 can be made by drop forging, the threads being formed by stamping, and after the welding of the parts together there will be little or no burr or extruded metal interfering with the threads. By the use of a core in a well known way the extrusion may be controlled so as to direct the burr to the outside of the work and to leave the threads clear.

The flange 3 of Fig. 1 may be similarly formed in segments and welded along the line 42, the portion of the flange beyond the outer face of the body 35 being first cut back as at 41 in Fig. 10.

To better illustrate the method, I have shown the parts at their contact points (as 6 and 7, Fig. 1) as they appear before welding. It will be understood that in the finished article these parts make complete or substantially complete contact across the joint. And though the two joints, as 6 and 7 are located at different planes, the joint-faces of the parts are not necessarily plane or flat.

Though I have described with great particularity of detail certain embodiments of my invention, yet it is not to be understood therefrom that the invention is restricted to the particular embodiments disclosed. Various modifications thereof in detail and in the arrangement of the parts may be made by those skilled in the art without departing from the invention as defined in the following claims.

What I claim is:

1. The method of applying a flange to a metal body which consists in welding it directly thereto by resistance welds along a plurality of joints located in different transverse planes and at the same time spreading the metal of one of the parts into an undercut recess in the other so as to lock them mechanically.

2. The method of applying an annular flange to a tubular metal body which consists in welding it directly thereto by resistance welds along a plurality of joints located in different planes transverse to the axis of the tube.

3. The combination with a tubular metal body of an annular flange mounted thereon and welded directly thereto with resistance welds along a plurality of joints located in different planes transverse to the axis of the tube.

4. The method of making a tubular article with parts of extra thickness which consists in forming segments of such an article and welding said segments together without welding the extra thickness of said parts.

5. The method of making a tubular article with flanges of extra thickness which consists in forming segments of such an article and welding said segments together without welding the extra thickness of said flanges.

6. A flanged tubular article formed of segments welded together, said segments having flange portions and body portions, the weld between the flange portions of the segments extending outward only to the line of the outer faces of the body portions.

7. A flanged tubular article formed of segments having body portions and flange portions, said segments being welded together throughout the full thickness of their body portions and through part of the thickness of the flange portions.

In witness whereof, I have hereunto signed my name.

THOMAS E. MURRAY.